June 6, 1950  C. M. HATHAWAY  2,510,575
REMOVABLE FLIGHT RECORDING APPARATUS
Filed Aug. 13, 1945  4 Sheets-Sheet 1

INVENTOR.
Claude M. Hathaway
BY
Moore, Olson & Trexler
attys.

June 6, 1950

C. M. HATHAWAY 2,510,575

REMOVABLE FLIGHT RECORDING APPARATUS

Filed Aug. 13, 1945

Inventor
Claude M. Hathaway
By: Moore, Olson & Trexler

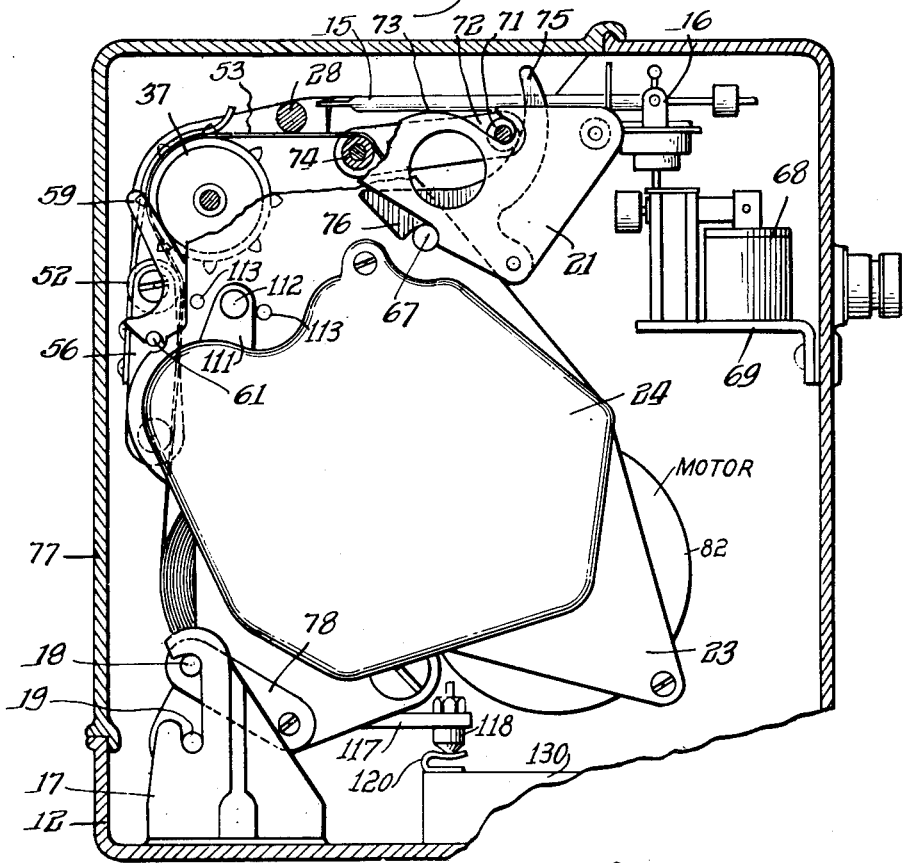
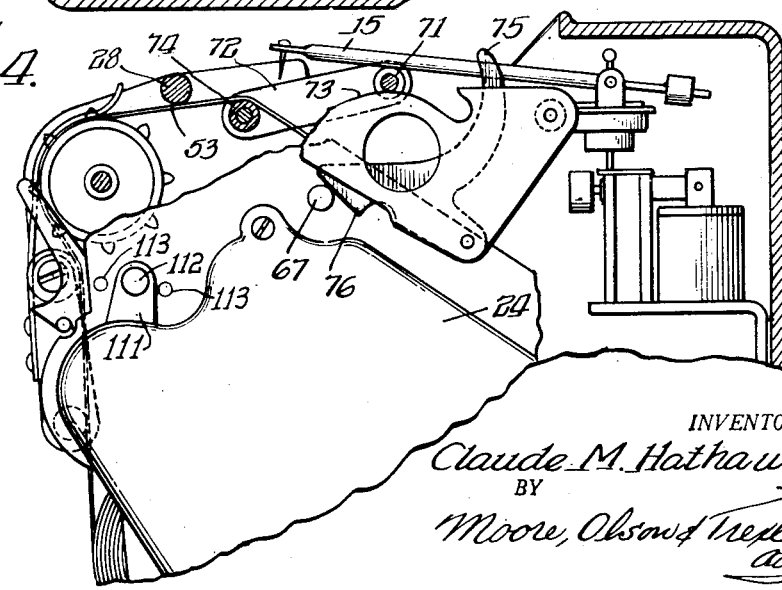

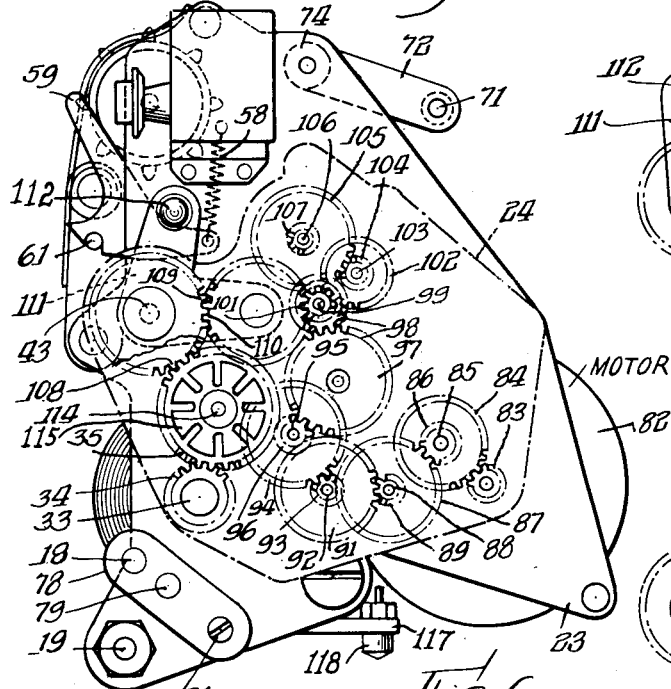
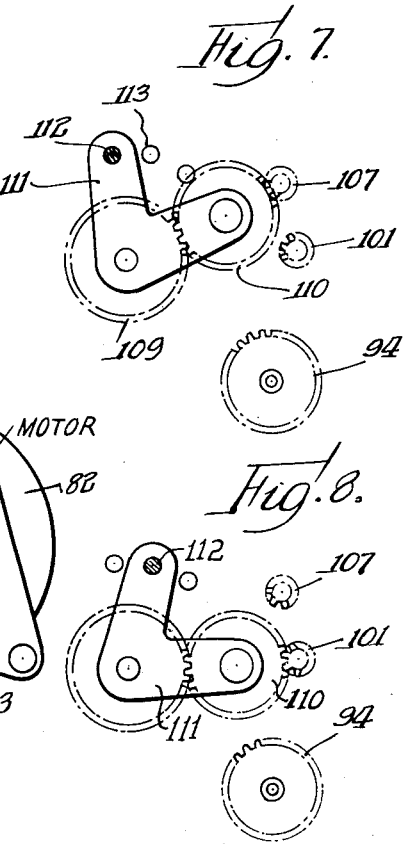
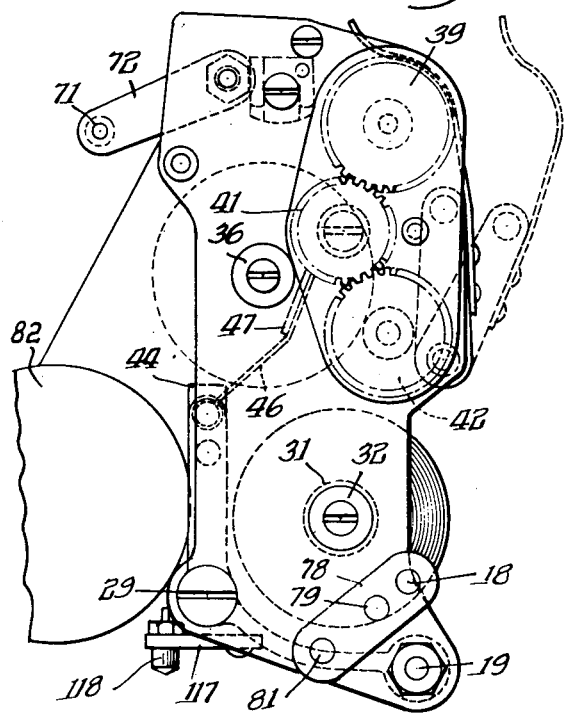
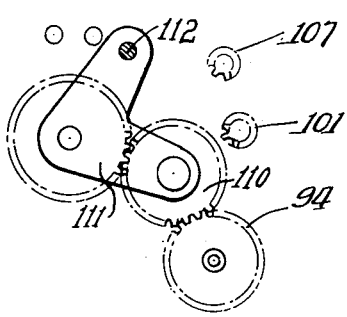

Patented June 6, 1950

2,510,575

UNITED STATES PATENT OFFICE 2,510,575

REMOVABLE FLIGHT RECORDING APPARATUS

Claude M. Hathaway, Denver, Colo.

Application August 13, 1945, Serial No. 610,462

3 Claims. (Cl. 346—145)

The present invention relates to recording apparatus, and more particularly to recording apparatus for producing multiple records of different factors to be recorded in a vehicle such as an aircraft.

In the operation of aircraft it is desired to obtain a record made during all flights of the craft which will indicate various factors such as acceleration, air speed, altitude and the like. A recording apparatus for this purpose is usually mounted in some portion of the craft which generally is not readily accessible. Since it is necessary to remove the record and to replace the recording material, it is desired to make such operations as convenient as possible, bearing in mind that the recording apparatus preferably is mounted in the craft where the device will not be in the way of the operating personnel or other equipment. The device must be mounted so as to withstand severe shocks encountered in taking off and landing the craft. If any portion of the mechanism of the recorder is to be made removable, the removable unit preferably should be so arranged as to positively and securely hold in a rigid manner and yet be capable of being removed without the use of special tools, screw drivers, wrenches, and the like. The recorder is arranged to begin operation after a predetermined altitude has been reached and to cease operation after the aircraft has returned to a similar altitude.

Where it is known that the craft is to go on a relatively long flight it is desired to reduce the recording speed so that a single loading of the magazine will be ample for a record of the entire flight. Therefore it is desired to provide a plurality of selective recording speeds for the recording apparatus. The recording material in operation is engaged by a plurality of styli which must be lifted or removed from the recording material whenever the chart carriage is removed from the apparatus. In view of the fact that the device is to be mounted in a relatively inaccessible part of the craft, it is essential to provide some means for insuring that all of the styli are lifted from the recording material and positioned so as to prevent any damage to the styli or to the instruments to which the styli are attached.

It, therefore, is an object of the present invention to provide an improved recording apparatus capable of operation at any one of a plurality of selective recording speeds.

It is another object of the present invention to provide in a recording apparatus a removable chart carriage and driving mechanism therefore which is rigidly mounted in the apparatus and locked in position.

It is still another object of the present invention to provide in a recording apparatus having a removable chart carriage means for lifting the recording styli from the chart material whenever the chart carriage is removed.

Still a further object of the present invention is to provide in a recording apparatus a removable chart carriage which is arranged to facilitate the reloading of record material for subsequent operation.

Still another object of the present invention is to provide a recording apparatus with an improved removable chart carriage for replacement of recording chart material or the replacement of the record carriage with another carriage to facilitate repairs and adjustments.

Other and further objects of the present invention subsequently will become apparent by reference to the following description taken in connection with the accompanying drawing wherein:

Figure 3 is a right side view of the interior of the apparatus as seen in the direction of the arrows along the line 3—3 of Figure 2;

Figure 4 is a view similar to Figure 3 where the cover has been removed and the chart carriage is in the process of being removed;

Figure 5 is a right end view of the chart carriage with the gear box cover removed;

Figure 6 is a left end view of the chart carriage; and

Figures 7, 8, and 9 are diagrammatic representations illustrating the manner in which gears are shifted for different operating speeds of the record material.

Figure 1:
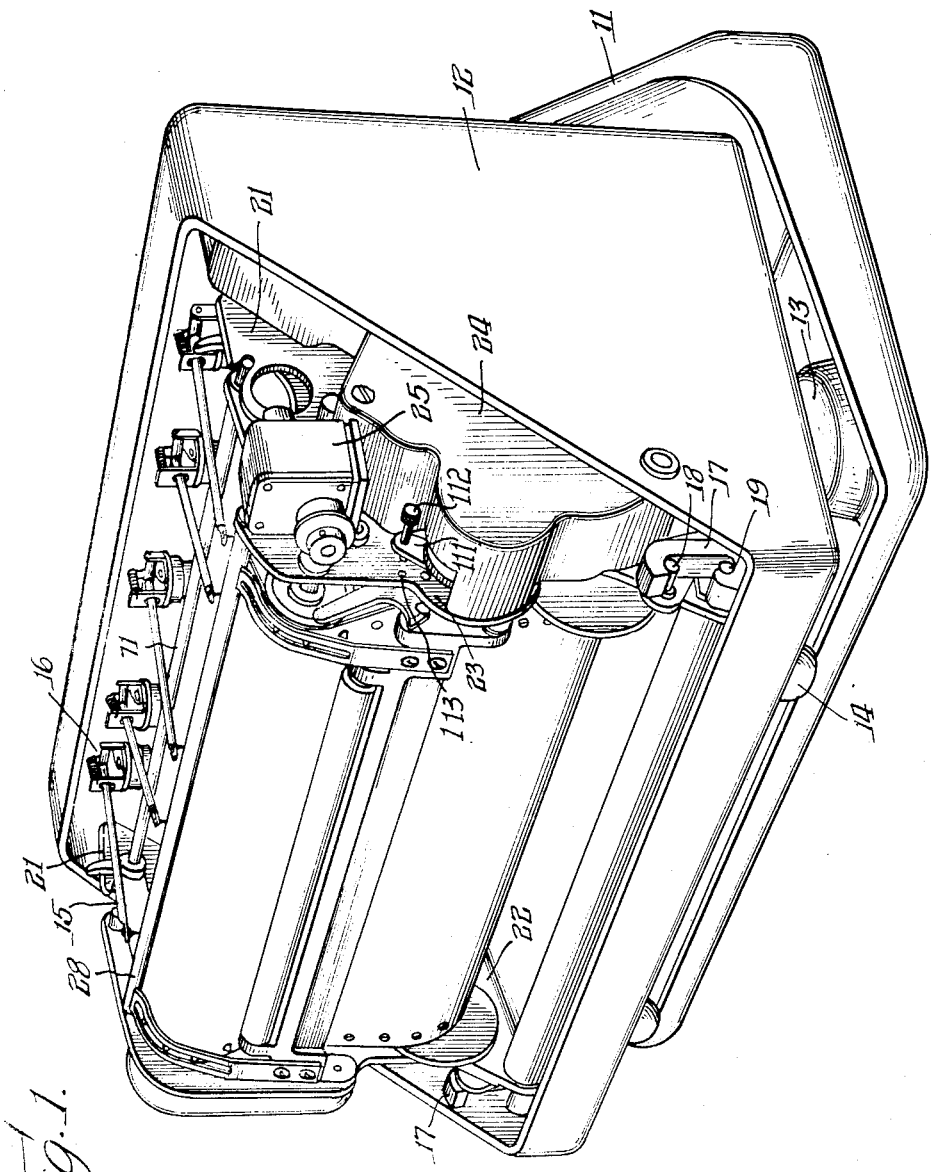
Figure 1 is a perspective view of a recording apparatus constructed in accordance with the present invention.

The general appearance of the apparatus incorporated in the present invention is illustrated in Figure 1 which shows a support frame 11 which is permanently installed in an aircraft for supporting the housing 12 of a recording apparatus. The support frame 11 is provided with a plurality of resilient shock absorbing cushions 13 one of which is visible in the figure. The cabinet 12 is mounted on the cushions 13 by a locking arrangement which permits the entire cabinet to be removed in the event of the necessity of servicing any of the apparatus therein which controls the operation for response to various factors which are to be recorded. The cabinet 12 is provided with a plurality of supports 14, which preferably also are of resilient material. Within the cabinet are mounted a plurality of styli 15 carried by suitable supports 16 which are arranged to be responsive to the various factors to be recorded. In the particular apparatus shown the outer end styli 15 are arranged to be controlled electromagnetically in response to apparatus mounted on other parts of the aircraft. The inner three styli are directly connecetd to apparatus mounted within the cabinet 12 responsive to such factors as acceleration, air speed, and altitude. The cabinet 12 adjacent its front is provided with a pair of support members 17 each adapted to engage studs 18 and 19 arranged at opposite ends of a removable chart carriage. Adjacent the top, the cabinet 12 is provided with a plurality of members 21 arranged to engage a plurality of studs not visible in this figure, but shown in other figures as will subsequently be explained. The removable chart carriage has a pair of end plates 22 and 23 which are interconnected by a plurality of support rods. Mounted on the right end plate 23 of the chart carriage is a set of gears enclosed within a gear cover 24. Just above the gear cover 24 there is mounted a register 25 which preferably is calibrated in units indicating the footage of chart material passing over the top roller of the chart carriage.

Figure 2:
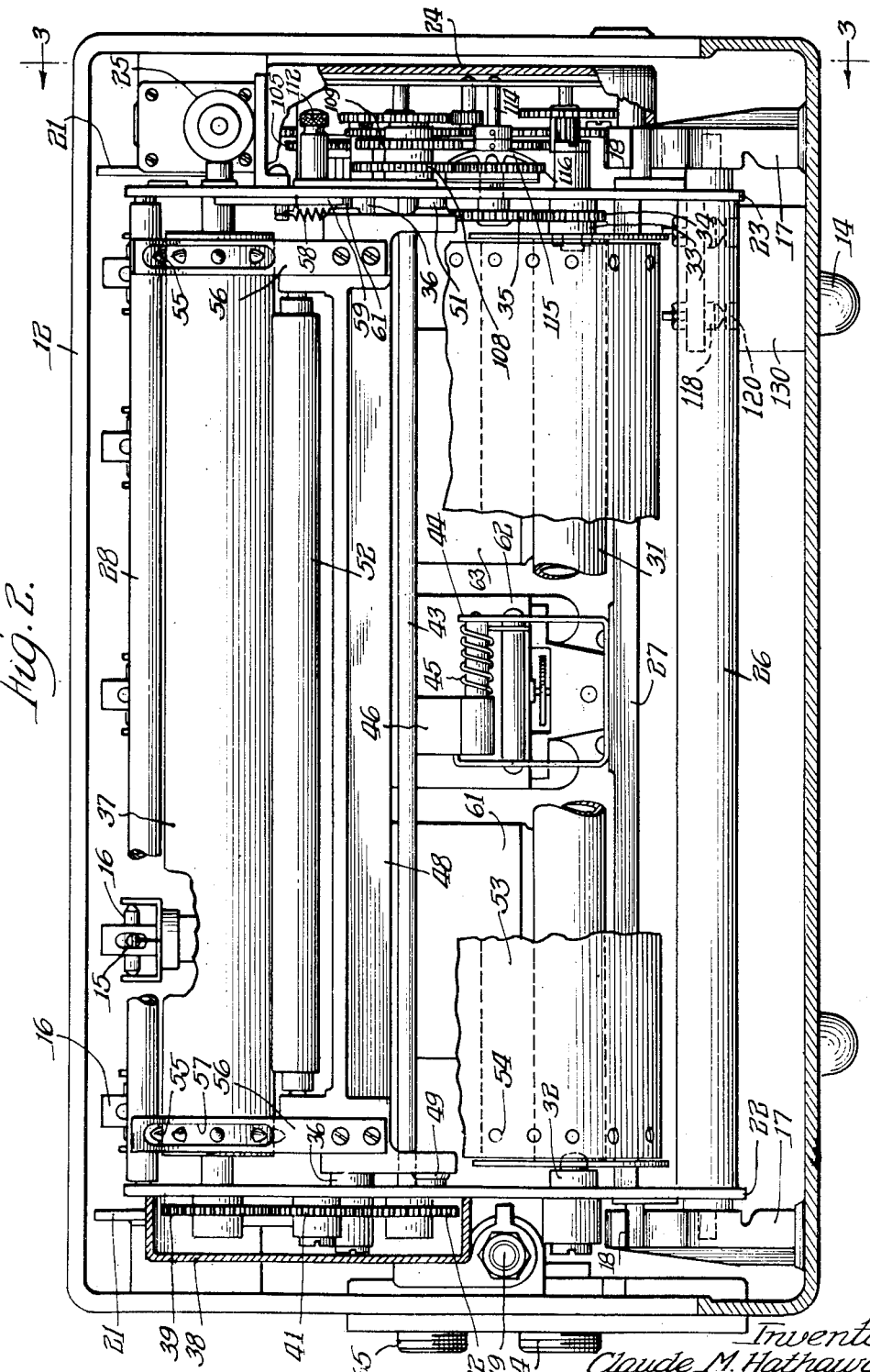
Figure 2 is a front view of the apparatus shown in Figure 1 with certain portions broken away to show details of construction.

By referring to Figure 2 it will be seen that the chart carriage has end plates 22 and 23 interconnected by transverse spacing and support rods 26, 27, and 28. The chart carriage has a removable chart receiving reel or roller 31 positioned adjacent the front of the carriage. One end of the chart roller or reel 31 is carried by a suitable supporting stud 32 positioned on the left plate 22. The other end of the record reel 31 is engaged by a keyed support 33 which is driven by a gear 34 in mesh with another gear 35. The gear 35 is driven from the gear mechanism within the gear cover 24 through a slip clutch so that at all times the record is being stored under a slight tension. The record supply roll is mounted between a plurality of support studs one of which 36 is shown mounted on the left end plate 22. A similar stud is provided on the right plate and is partly visible in this figure. The chart driving roller 37 is mounted adjacent the upper portion of the chart carriage and is driven through a plurality of gears enclosed in the gear box 38 on the left end plate 22. The chart driving roller 37 therefore is connected to a gear 39 which engages an idler gear 41 which in turn is in engagement with a driving gear 42. The driving gear 42 is connected to a shaft 43 which extends across the chart carriage to gears within the gear housing 24. The gears within the housing 24 are so arranged that different driving speeds may be imparted to the shaft 43 thereby providing different chart speeds for the roller 37. In order that the material supplied to the chart roller 37 may always be under uniform tension, there is mounted on the transverse rod or bar 27 a tension structure comprising a U-shaped member 44 carrying a tension spring 45 which acts against a finger or arm 46. The outer extremity of the finger 46 is provided with a suitable friction pad or surface 47 shown in Figure 6 to insure proper tension to the record material. The upper portion of the chart carriage has a chart guide comprising a transverse member 48 arranged for pivotal mounting by two pivot supports 49 and 41. The transverse member 48 carries an idler roller 52 which serves to hold the central portion of the chart material in firm relation on the chart driving roller 37. The chart material may comprise recording paper 53 provided adjacent each of its edges with a plurality of perforations 54. The perforations 54 are arranged to be engaged by the sprocket teeth 55 arranged at each end of the driving roller 37. The transverse guide member 48 is provided at each end with apertured spring clips 56 having an elongated aperture 57 adapted to engage the chart paper on each side of the row of peripherally arranged sprocket teeth 55. The chart guiding apparatus thus far described is retained in proper relation relative to the roller 37 by the action of a spring 58 which engages one extremity of a locking lever 59 best shown in Figure 5.

The spring 58 is connected to a supporting stud on the right end plate 23. The locking lever 59 is arranged to engage a stud 61 which extends from the right end portion of the transverse member 48. The lever 59 is provided with an outwardly extending finger portion for ready operation to release the stud 61 whenever it is desired to swing forwardly the idler roller 52 of the spring clips 56. The spring clips are shown as being moved forwardly by the dotted line representation in Figure 6.

It was previously mentioned that the housing 12 contained a plurality of styli and that in the particular arrangement shown the inner three styli were controlled from self-contained apparatus. The outlines of such apparatus for air speed, acceleration, and altitude, 61, 62, and 63 respectively, are visible below the transverse shaft 43. Adjacent the left side of the housing 12 a plurality of terminals 64 and 65 are shown which are adapted to receive electrical connectors for controlling the action of the two end styli 15 thereby to record certain factors obtained from apparatus located in other portions of the craft. The accelerometer for recording air speed is described and claimed in my co-pending application for accelerometers, Serial Number 592,945 filed May 10, 1945, now Patent No. 2,440,605, granted April 27, 1948.

The manner in which the removable chart carriage is mounted in the cabinet and is pivotally moved for release therefrom will become apparent from a consideration of Figures 3 and 4. Figure 3 shows the chart carriage supported by the studs 19 which are in engagement with the support member 17, and by the support members 21 which engage the studs 67 secured to the carriage end plates 22 and 23. For sake of clarity only the right hand stylus 15 has been shown which is carried by its support 16 which is adapted to be actuated by an electromagnet 68 mounted on a bracket 69. The stylus 15 extends over a transversely arranged bar 71 which is pivotally supported by a pair of arms 72 secured to the end plates 22 and 23. The outer extremities of the bar 71 which may be of reduced diameter engage a cam surface 73 formed at the upper portion of the support member 21. The cam surface 73 is so arranged that the bar 71 in Figure 3 is an appreciable distance below the styli 15 so that the marker needles are in engagement with the record material or paper 53 which extends over a transverse roller 74 arranged between the carriage side plates 22 and 23. The support plates 21 are provided with latches 75 having a latching portion 76 adapted normally to engage the upper side of the pin 67 to retain the chart carriage in locked operating position.

In order to remove the chart carriage from the cabinet 12 the cover 77 is first removed. Thereupon the operator engages both of the latches 75 by pushing inwardly on the upwardly extending finger portions thereby to raise the depending portion 76 away from the upper surface of the transversely arranged studs 67. Thereupon the carriage may be tilted forwardly. When the carriage is tilted forwardly the transverse rod 71 supported by the lever arm 72 rides upwardly on the cam surface 73 so as to engage the underside of the styli 15 to raise the styli needle points from the recording paper 53. This action is shown in Figure 4. Since all the styli are thus automatically raised by mere rearward movement of the chart carriage, there is no possibility of damaging the record or the styli. The cam surface 73 is curved downwardly so that a further movement of the carriage in a pivotal manner about the lowermost support 19 permits the transverse rod 71 to drop downwardly so as to return the styli arms 15 to a horizontal position. When the carriage is returned the first action taking place is the engagement of the lower studs 19 with the support member 17. The second action is the engagement of the transverse rod 71 with the cam surface 73. This is followed by the engagement of the rod 71 to the styli arms 15 which raises the arms to such position that the carriage may be moved inwardly into the cabinet until the ultimate operating position is obtained as shown in Figure 3 whereupon the latch 75 having been displaced by the entering studs 67 operates to lock or latch the carriage in position. In order to provide the maximum amount of rigidity for the carriage in the position shown in Figure 3, the upper studs 18 are each mounted on pivoted arms 78 as is readily apparent from Figures 5 and 6. The lower extremity of each of the arms 78, which arms are pivoted at 79, is secured in position by a screw 81 extending into the side mounting plates. The screws 81 pass through openings slightly larger than the screws so that a small amount of pivotal movement of the levers 78 may be obtained in order to compensate for any differences in the support member 17 either due to wear or minor variations in manufacture. It will be noted that the upper portion of the support 17 has such configuration that the upper stud 18 closely follows the upper inner surface during the latter portion of the movement of the carriage into the cabinet.

The manner in which the chart is driven at a plurality of selected speeds is illustrated by the structure shown in Figures 5 and 6. To facilitate the understanding of the arrangement of the gears under the gear box cover 24, the cover has been removed in Figure 5 and the gears have been represented by circles. Where the gears engage other gears, teeth have been shown so that from the figure it may become apparent how the chart material is moved from the supply reel to the record reel. The cabinet 12 is supplied with suitable power which may if desired be converted by a rectifier and synchronous inverter to supply power to a synchronous motor 82. The motor 82 has a shaft connected to a gear 83 which meshes with a gear 84. The gear 84 is on a shaft 85 which carries a gear 86. The gear 86 engages a gear 87 on a shaft 88 which carries a smaller gear 89. The gear 89 engages a gear 91. The gear 91 is mounted on shaft 92 carrying a gear 93. The gear 93 which is smaller than the gear 91 engages a larger gear 94 mounted on a shaft 95 which carries a smaller gear 96.

The gear 96 engages an idler gear 97 which is in engagement with gear 98 mounted upon shaft 99 and carrying a smaller gear 101. The gear 101 engages a larger gear 102 mounted on a shaft 103 carrying a smaller gear 104. The gear 104 engages a larger gear 105 mounted on a shaft 106 carrying a smaller gear 107. The gears 94, 101, and 107 are arranged in a common plane, and the medial line through the teeth are at equal distances from the shaft 43 along lines drawn between the axes of the shafts 43, 95, 99, and 106. The shaft 43 carries two gears 108 and 109 as may be seen from Figure 2 and Figure 5. The gear 109 engages a gear 110 mounted on a bell crank plate 111, as is apparent from Figures 5, 7, 8 and 9. The gears 109 and 110 are in the same plane, and the plate 111 is pivoted on an axis coincident with the axis of the gear 109. The other extremity of the bell crank plate 111 carries a retractable detent 112, shown in Figures 1, 2, 3, 4 and 5, adapted to engage any one of a plurality of spaced apart arcuately arranged apertures 113 formed in the plate 23, as shown in Figures 1, 3 and 4. The gear 110 is in the same plane as the gears 94, 101, and 107 and is arranged for selective engagement with any one of these gears.

By withdrawing the retractable detent 112 the bell crank 111 may be fixed so that the detent will engage one of the other apertures 113 in the end support plate 23 thereby to change the operating speed of the shaft 43 which it will be recalled is connected through gears 42, 41 and 39 to the chart driving roller 37. The manner in which this change of driving speed may be obtained is illustrated diagrammatically in Figures 7, 8 and 9.

In the first figure the gears are shown for the slowest recording speed which for example may be two inches per hour. Figure 8 shows an intermediate rate of speed which for example may be twenty inches per hour. Figure 9 shows the highest rate of speed which for example may be one hundred twenty inches per hour. The arrangement shown provides reliable operation without the necessity of any key-ways and sliding gears. The shaft 43 which also carries the gear 108 also serves to transmit power to the chart receiving roller 31. The roller 31 is mounted upon the stud 33 which is connected to the gear 34 which is in engagement with the gear 35. The gear 35 is mounted upon a shaft 114 which carries a friction clutch 115. Loosely mounted upon the shaft 114 is a gear 116 which is in engagement with the gear 108. The friction clutch 115 may be formed of resilient metal having a plurality of fingers engaging the gear 116. The gear ratio is such that there is a tendency to drive the shaft 33 at a speed in excess of that required particularly at a time when the chart roller 31 is very nearly full. The slip clutch 115 provides a convenient means for the difference in the rate of speed of the roller 31 between the initial period of the operation of the chart and the final period, and also maintains adequate tension so that the chart is securely and evenly rolled upon the roller 31.

From Figures 2, 3, 5 and 6 it will be seen that the carriage is provided with an insulated plate 117 which carries a plurality of electric contacts 118 connected in the power supply circuit for the synchronous motor 82. Since the carriage is tipped upwardly when removed the electric contacts 118 are removed from their cooperating contacts 120 thereby insuring complete breaking of the circuit so that even if the manually operable electric switch 119 shown in Figure 2 were in the "on" position no operation would take place. The manually operable switch 119 is provided for causing the chart driving motor to operate to check the operation of the device or to initiate operation prior to the take-off of the aircraft.

From the foregoing it will be seen that there has been provided a recording apparatus having a removable chart carriage which is rigidly and securely retained in position. Various operating speeds are provided by a relatively simple gear arrangement. While mention has been made of certain functions for the various styli and apparatus connected therewith, it is to be understood of course that other functions may be employed and that a greater or lesser number of styli may be provided. Furthermore such other variations and modifications of the structure are contemplated, although a preferred embodiment has been shown in the drawing, as may be commensurate with the spirit and scope of the invention set forth in the following claims.

This invention is hereby claimed as follows:

1. In a recording apparatus having a cabinet provided with a record carriage arranged to be removed therefrom without the use of tools, the combination comprising support means adjacent the bottom and front of said cabinet for supporting said carriage, said support means being spaced apart so as to be located at opposite sides of said carriage, said support means having a C-shaped configuration, a pair of outwardly transversely extending studs mounted on each side of said carriage for engagement with the inner upper and lower surfaces of each of said C-shaped support members, and manually operable means positioned adjacent the top of said carriage for locking said carriage in rigid position within said cabinet.

2. In a recording apparatus having a cabinet provided with a record carriage arranged to be removed therefrom without the use of tools, the combination comprising support means adjacent the bottom and front of said cabinet for supporting said carriage, said support means being spaced apart so as to be located at opposite sides of said carriage, said support means having a C-shaped configuration, a pair of outwardly extending studs mounted on each side of said carriage for engagement with the inner upper and lower surfaces of each of said C-shaped support members, the upper one of each pair of studs being mounted on a lever arranged for limited pivotal adjustment, and means positioned adjacent the top of said carriage for locking said carriage in rigid position within said cabinet.

3. In a record carriage having driving means and a record roll, the combination of means for changing the speed of operation of the record roll including a gear train connected to said driving means, said gear train including a plurality of gears spaced apart in a common plane operating at different speeds and having medial tooth lines arranged tangent to an arc of a circle, a driving gear having its center coincident with the center of said circle connected to the record roll of said carriage, and an idler gear connected to said driving gear, said idler gear being mounted in said common plane on a lever so that said idler gear may be moved in an arc to mesh with any one of a plurality of said first gears, said arc having its center coincident with the axis of said driving gear, and latching means mounted on the lever for selective retention of said idler gear in engagement with a desired one of said plurality of gears.

CLAUDE M. HATHAWAY.

REFERENCES CITED

The following references are of record in the file of this patent:

UNITED STATES PATENTS

| Number | Name | Date |
| --- | --- | --- |
| 713,945 | Breckenridge et al. | Nov. 18, 1902 |
| 1,193,174 | Merwin et al. | Aug. 1, 1916 |
| 1,469,988 | Bryce et al. | Oct. 9, 1923 |
| 1,598,595 | Angus | Sept. 7, 1926 |
| 1,757,012 | Foote | May 6, 1930 |
| 1,847,918 | Blanchard | Mar. 1, 1932 |
| 1,886,844 | Spitzglass | Nov. 8, 1932 |
| 2,074,118 | Ross et al. | Mar. 16, 1937 |
| 2,153,317 | Sigo | Apr. 4, 1939 |
| 2,389,828 | Swift | Nov. 27, 1945 |
| 2,414,976 | Redhed | Jan. 28, 1947 |